US008359140B2

(12) United States Patent
Kodaka et al.

(10) Patent No.: US 8,359,140 B2
(45) **Date of Patent: *Jan. 22, 2013**

(54) PEDAL LOCK CONTROL DEVICE FOR WORK VEHICLE

(75) Inventors: Katsuaki Kodaka, Abiko (JP); Hidetoshi Satake, Ishioka (JP); Youichi Kowatari, Kasumigaura (JP); Yuuki Gotou, Tsuchiura (JP); Kazuhiro Ichimura, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 361 days.

This patent is subject to a terminal disclaimer.

(21) Appl. No.: 12/680,941

(22) PCT Filed: Sep. 30, 2008

(86) PCT No.: PCT/JP2008/067751

§ 371 (c)(1),
(2), (4) Date: Mar. 31, 2010

(87) PCT Pub. No.: WO2009/044738

PCT Pub. Date: Apr. 9, 2009

(65) Prior Publication Data

US 2010/0274436 A1 Oct. 28, 2010

(30) Foreign Application Priority Data

Oct. 1, 2007 (JP) ................................ 2007-257717

(51) Int. Cl.
*B60K 31/02* (2006.01)

(52) U.S. Cl. ............ 701/50; 701/93; 180/170; 180/179

(58) Field of Classification Search .................. 180/170, 180/178, 179; 701/50, 93, 97

See application file for complete search history.

(56) References Cited

U.S. PATENT DOCUMENTS 3,777,841 A * 12/1973 Thorner ........................ 180/172

(Continued)

FOREIGN PATENT DOCUMENTS

EP 1 310 648 A1 5/2003

(Continued)

OTHER PUBLICATIONS

International Search Report dated Jan. 20, 2009 (Two (2) pages).

(Continued)

*Primary Examiner* — Ruth Ilan

(74) *Attorney, Agent, or Firm* — Crowell & Moring LLP

(57) ABSTRACT

A pedal lock control device for work vehicle includes: a motor driving device that drives a travel hydraulic motor in response to an operation amount of a travel pedal; a locking device that locks the travel pedal in a state of being operated; an instruction device that instructs lock and unlock of the travel pedal by the locking device upon an operation by an operator; a first detection device that detects a first signal change according to an unlock operation which is an operation that reflects an intention of an operator to release the locking device and is other than an unlock operation by the instruction device; a second detection device that detects a second signal change according to an unlock operation which is an operation that reflects an intention of an operator to release the locking device and is other than the unlock operation by the instruction device, with the second signal change being different from the first signal change; and a lock control device that unlocks the locking device when an unlock operation is detected by at least one of the first detection device and the second detection device in a state where the travel pedal is locked by the locking device.

6 Claims, 4 Drawing Sheets

U.S. PATENT DOCUMENTS

| | | | | |
|---|---|---|---|---|
| 4,422,518 | A * | 12/1983 | Treadwell | 180/175 |
| 4,879,657 | A | 11/1989 | Tamura et al. | |
| 4,890,231 | A * | 12/1989 | Frantz | 701/97 |
| 6,186,499 | B1 | 2/2001 | Gross | |
| 6,889,791 | B2 * | 5/2005 | Watanabe | 180/271 |
| 7,706,953 | B1 * | 4/2010 | Sun | 701/93 |
| 2010/0217492 | A1 | 8/2010 | Kodaka et al. | |
| 2010/0274436 | A1 * | 10/2010 | Kodaka et al. | 701/29 |

FOREIGN PATENT DOCUMENTS

| | | | |
|---|---|---|---|
| GB | 2 328 268 | A | 2/1999 |
| JP | 61-235224 | A | 10/1986 |
| JP | 62-185930 | A | 8/1987 |
| JP | 63-239326 | A | 10/1988 |
| JP | 1-266023 | A | 10/1989 |
| JP | 5-178118 | A | 7/1993 |
| JP | 9-34 | U | 1/1997 |
| JP | 10-338051 | A | 12/1998 |
| JP | 11-59221 | A | 3/1999 |
| JP | 2006-7849 | A | 1/2006 |
| JP | 2006-123586 | A | 5/2006 |

OTHER PUBLICATIONS

International Search Report (Form PCT/ISA/210) dated Jan. 13, 2009 (three (3) pages).

U. S. Office Action dated Jun. 5, 2012 of co-pending U.S. Appl. No. 12/680,856 (sixteen (16) pages).

Extended European Search Report dated Oct. 1, 2012 (seven (7) pages).

* cited by examiner

PEDAL LOCK CONTROL DEVICE FOR WORK VEHICLE

TECHNICAL FIELD

The present invention relates to a pedal lock control device for work vehicle such as a wheeled hydraulic excavator.

BACKGROUND ART

There is a device for this sort of work vehicles known in the related art that can fix the travel pedal in a state where it is depressed (refer to, for example, patent reference literature 1). In the device in Patent Reference Literature #1, when an operation switch is turned on in a state where the travel pedal is depressed, an electromagnet is actuated and the travel pedal is locked by a magnetic force into a state where it is depressed. Then, when the operation switch is turned off or a brake pedal is operated, the electromagnet is deactuated and the pedal is unlocked.

Patent Reference Literature 1: Japanese Laid Open Patent Publication No. H5-178118

DISCLOSURE OF THE INVENTION

Problems to be Solved by the Invention

In the device in Patent Reference Literature #1, a cancel switch detects a depression of the brake pedal. However, in the event of a failure of the cancel switch, the pedal can not be unlocked except in the case that the operation switch is turned off.

Means for Solving the Problems

A pedal lock control device for work vehicle according to a first aspect of the present invention comprises: a motor driving device that drives a travel hydraulic motor according to an operation amount of a travel pedal; a locking device that locks the travel pedal in a state of being operated; an instruction device that instructs lock and unlock of the travel pedal by the locking device upon an operation by an operator; a first detection device that detects a first signal change according to an unlock operation which is an operation that reflects an intention of an operator to release the locking device and is other than an unlock operation by the instruction device; a second detection device that detects a second signal change according to an unlock operation which is an operation that reflects an intention of an operator to release the locking device and is other than the unlock operation by the instruction device, with the second signal change being different from the first signal change; and a lock control device that unlocks the locking device when an unlock operation is detected by at least one of the first detection device and the second detection device in a state where the travel pedal is locked by the locking device.

According to a second aspect of the present invention, in the pedal lock control device for work vehicle according to the first aspect, it is preferable that the first detection device is a first deceleration detection device that detects deceleration operation of the work vehicle as the first signal change; and the second detection device is a second deceleration detection device that detects deceleration operation of the work vehicle as the second signal change.

According to a third aspect of the present invention, in the pedal lock control device for work vehicle according to the second aspect, the first deceleration detection device may be a brake operation detection device that detects an operation of a brake pedal as the first signal change; and the second deceleration detection device may be a brake pressure detection device that detects brake pressure applied to a braking device by an operation of the brake pedal as the second signal change.

According to a fourth aspect of the present invention, in the pedal lock control device for work vehicle according to the second aspect, the first deceleration detection device may be a brake operation detection device that detects an operation of a brake pedal as the first signal change; and the second deceleration detection device may be a return operation detection device that detects a return operation of the travel pedal as the second signal change.

According to a fifth aspect of the present invention, it is preferable for the pedal lock control device for work vehicle according to the first to fourth aspects to further comprise: a vehicle speed detection device that detects vehicle traveling speed of the work vehicle, wherein the lock control device unlocks the locking device, in a state where the travel pedal is locked by the locking device, if an unlock operation is detected by at least one of the first detection device and the second detection device or if a state in which a vehicle speed that has, been detected by the vehicle speed detection device is equal to or less than a predetermined value is detected continuously for a predetermined duration.

According to a sixth aspect of the present invention, it is preferable for the pedal lock control device for work vehicle according to the first to fourth aspects to further comprise: a back and forth movement detection device that detects a forward movement instruction, a backward movement instruction, and a neutral instruction for the work vehicle, wherein: the lock control device unlocks the locking device, in a state where the travel pedal is locked by the locking device, if an unlock operation is detected by at least one of the first detection device and the second detection device or if either one of the backward movement instruction and the neutral instruction is detected by the back and forth movement detection device.

According to a seventh aspect of the present invention, in the pedal lock control device for work vehicle according to the first to sixth aspects, the locking device may comprise a locking member provided below the travel pedal and an attaching member provided on a back of the travel pedal so as to be attached to the locking member, and lock the travel pedal by attaching the attaching member to the locking member.

A work vehicle according to an eighth aspect of the present invention is provided with the pedal lock control device according to the first to seventh aspects.

Advantageous Effect of the Invention

According to the present invention, the travel pedal is reliably unlocked even in the event of a failure of either one of the first detection device and the second detection device.

BEST MODE FOR CARRYING OUT THE INVENTION

An embodiment of the present invention will now be explained in reference to FIG. 1 to FIG. 4.

Figure 1:
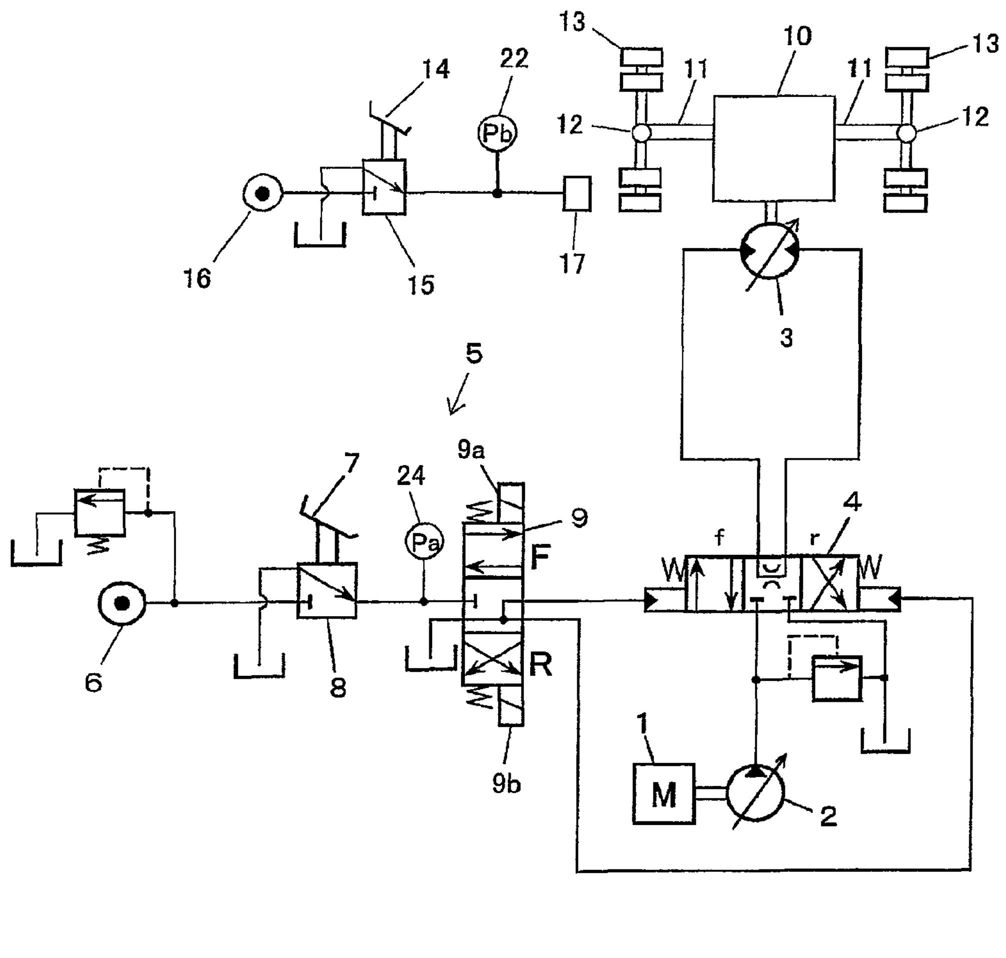
FIG. 1 is a hydraulic circuit diagram of a work vehicle having the pedal lock control device according to an embodiment of the present invention.

FIG. 1 is a hydraulic circuit diagram of a work vehicle having the pedal lock control device according to the present embodiment, in particular, a hydraulic circuit diagram for traveling for a work vehicle such as a wheeled hydraulic excavator, which is provided with tires so as to travel at work sites and along roads.

The hydraulic circuit is provided with a hydraulic pump 2 that is driven by an engine 1, a hydraulic motor 3 that is driven by pressure oil from the hydraulic pump 2, a travel control valve 4 that controls the flow of pressure oil from the hydraulic pump 2 to the hydraulic motor 3, and a pilot hydraulic circuit 5 that operates the control valve 4. The pilot hydraulic circuit 5 includes a pilot hydraulic source 6, a pilot valve 8 that generates pilot pressure in response to the operation amount of a travel pedal 7 by an operator, and a forward/reverse switching valve 9 that is switched among a forward movement position, a backward movement position, and a neutral position in response to an operation of a forward/reverse selector switch 25 (FIG. 3) by the operator.

In FIG. 1, the forward/reverse switching valve 9 is switched to the forward movement position (F position) when a solenoid 9*a* of the forward/reverse switching valve 9 is excited, and the forward/reverse switching valve 9 is switched to the backward movement position (R position) when a solenoid 9*b* is excited. The control valve 4 is switched to the neutral position in a state where the forward/reverse switching valve 9 is switched to the neutral position as illustrated. In this state, the flow of pressure oil from the hydraulic pump 2 to the hydraulic motor 3 is blocked regardless of the operation of the travel pedal 7.

When the travel pedal 7 is depressed in a state where the forward/reverse switching valve 9 is switched to the forward movement position or the backward movement position, a travel pilot pressure Pa is applied to the control valve 4 in response to the operation amount of the travel pedal, and the control valve 4 is switched from the neutral position as illustrated, to the position f or the position r. As a result, the pressure oil is supplied from the hydraulic pump 2 to the hydraulic motor 3, so that the hydraulic motor 3 is activated. The rotation of the hydraulic motor 3 is shifted by a transmission 10 and then transmitted to tires 13 through propeller shafts 11 and axles 12, so that the vehicle travels. The travel pilot pressure Pa is detected by a travel operation sensor 24 so as to detect whether or not the travel pedal 7 has been operated. The transmission 10 can be switched between two speeds, low and high, by operating a shift switch.

When a brake pedal 14 is depressed while traveling, a pilot valve 15 is activated in response to the operation amount of the brake pedal and the brake pressure Pb is applied from a hydraulic source 16 to a braking device 17. As a result, the braking device 17 is actuated and braking force is applied to the vehicle corresponding to the brake pressure Pb. When depression of the brake pedal 14 is stopped, the brake pressure Pb is not applied and the braking device 17 is released from operation. The brake pressure Pb is detected by a brake pressure sensor 22.

Figure 2:
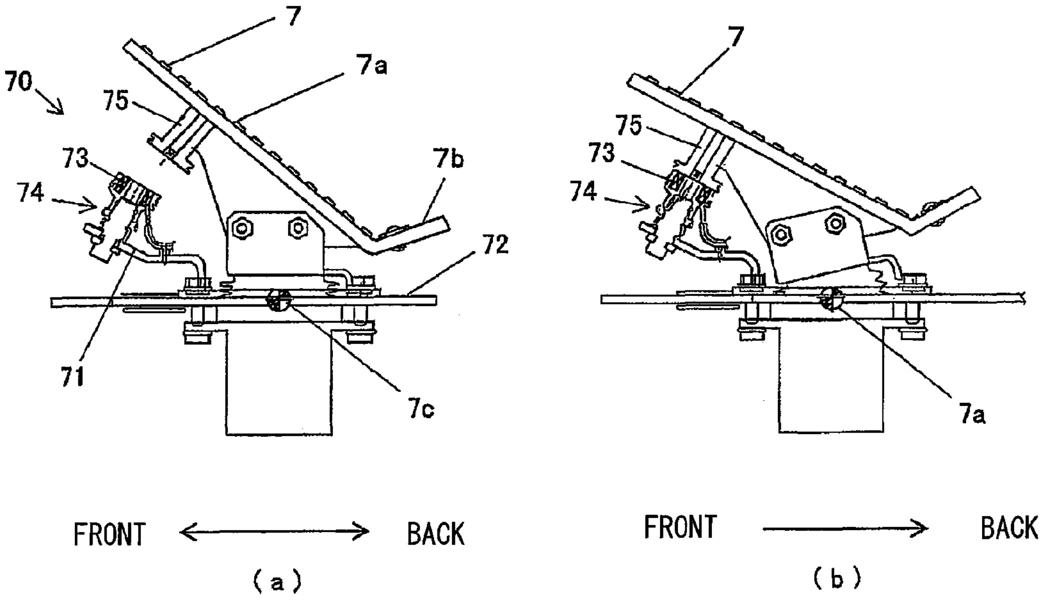
FIG. 2(*a*) and (*b*) illustrate the structure of the travel pedal shown in FIG. 1.

FIGS. 2(*a*) and 2(*b*) illustrate the structure of the travel pedal 7 provided in the operator's cab of the work vehicle so as to be operated by the operator. FIG. 2(*a*) illustrates a non-operational state of the travel pedal 7, whilst FIG. 2(*b*) illustrates a fully depressed state. The rear end section of the travel pedal 7 bends upward in substantially L shape, and a front depressing section 7*a* and a rear depressing section 7*b* are provided in the travel pedal 7 across the bend section. The travel pedal 7 is supported at a floor plate 72 so as to rotate in a forward and backward direction about a pivot axis 7*c* provided below the front depressing section 7*a*, and is, while not operated, biased to an initial position as in FIG. 2(*a*) by a return spring (not figured). When fully depressed, the travel pedal 7 can be locked to a locking device 70.

The structure of the locking device 70 will now be explained. Below the travel pedal 7, a locking member 74 is fixed to the floor plate 72 through an arm 71. The locking member 74 is provided with a solenoid 73 so that the locking member 74 functions as an electromagnet that produces a magnetic force by excitation of the solenoid 73. An attaching member 75, constituted with magnetic material such as iron, is provided on the back side of the travel pedal 7 in a downward protruding manner, so that the travel pedal 7 can be forward depressed until the attaching member 75 abuts against the locking member 74.

When the solenoid 73 is excited in a state where the travel pedal 7 is operated to a fully depressed position, magnetic force is generated in the locking member 74 and the attaching member 75 is attached to the locking member 74. In this manner, the locking device 70 is actuated and the travel pedal 7 is fixed (locked), so that a state of full depression can be maintained even in a state where the operator takes his foot off the pedal 7. As the solenoid 73 is demagnetized, the magnetic force is demagnetized and the lock of the travel pedal 7 is released (unlocked). When the rear depressing section 7*b* is depressed in a state where the travel pedal 7 is locked, the pedal pressure overcomes the attraction power, thereby returning the travel pedal 7 to the initial position.

The structure of the travel pedal 7 shown in FIGS. 2(*a*) and 2(*b*) is unique to work vehicles. In other words, since the maximum travel speed of work vehicles is lower than that of passenger vehicles, the work vehicles often travel with the travel pedal 7 fully depressed. Accordingly, if the travel pedal 7 can be fixed in a state of being fully depressed, it is not necessary to constantly apply pedal pressure to the travel pedal 7, thereby significantly reducing load on the operator. It is to be noted that although a so-called auto cruise control is known in the field of passenger vehicles as a means to keep the travel speed constant, the auto cruise control does not fix the travel pedal 7 in a state of being depressed and therefore it is different from the pedal lock control device of the present application. Since the pedal lock control device only needs to control on-off of the solenoid 73, the structure thereof is more simple than that of the auto cruise control.

Assuming that the pedal lock control device is configured to lock the travel pedal 7 as the operator operates a lock actuating switch. In such case, a problem may arise since the pedal is locked against the operator's will when the switch is operated accidentally. On the other hand, it is desirable for safety reasons that the pedal can be unlocked not only when the operator operates an unlock switch but also when he operates, for instance, the brake pedal 14. However, it is a problem that the pedal is not unlocked unless brake operation is detected due to a failure of the sensor or the like although the brake pedal 14 has been operated. The present embodiment assumes the following structure so as to solve those problems.

Figure 3:
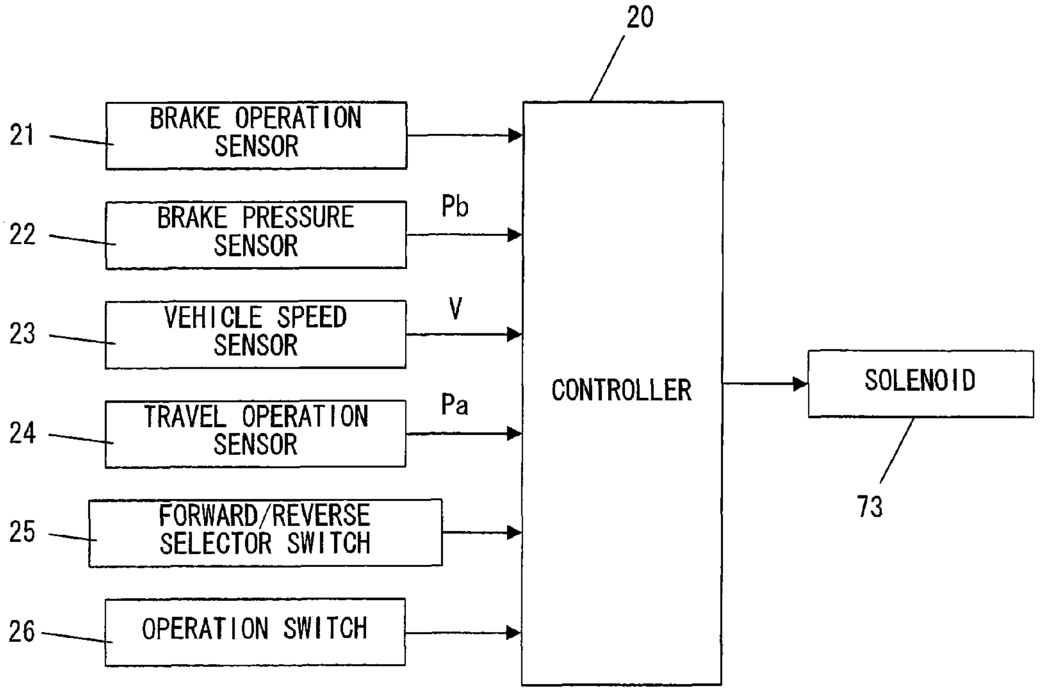
FIG. 3 is a block diagram that shows the structure of the pedal lock control device according to the present embodiment.

FIG. 3 is a block diagram that shows the structure of the pedal lock control device according to the present embodiment. A brake operation sensor 21 such as a limit switch that detects whether or not the brake pedal 14 has been operated, the brake pressure sensor 22 that detects the brake pressure Pb applied to the braking device 17, a vehicle speed sensor 23 that detects a vehicle speed v of the work vehicle, the travel operation sensor 24 that detects the travel pilot pressure Pa according to operation of the travel pedal 7, the forward/reverse selector switch 25 that instructs back and forth movements of the vehicle, and an operation switch 26 that instructs lock/unlock of the travel pedal 7 are connected to a controller 20.

The operation switch 26 is a push switch that outputs an ON signal, for example, for each pressing operation, which is provided in the vicinity of a steering wheel so that the operator can easily operate while traveling. The operation switch 26 cancels the lock/unlock of the travel pedal 7, so that an unlocking instruction is output when the operation switch 26 is turned on in a state where the pedal is locked and a lock instruction is output when the operation switch 26 is turned on in a state where the pedal is unlocked.

The controller 20 is constituted by including a processing unit that includes a CPU, a ROM, a RAM, other peripheral circuits, and the like. In response to signals from the sensors 21 to 24 and the switches 25 and 26, the controller 20 executes the following processing so as to output a control signal to the solenoid 73 for locking the pedal.

Figure 4:
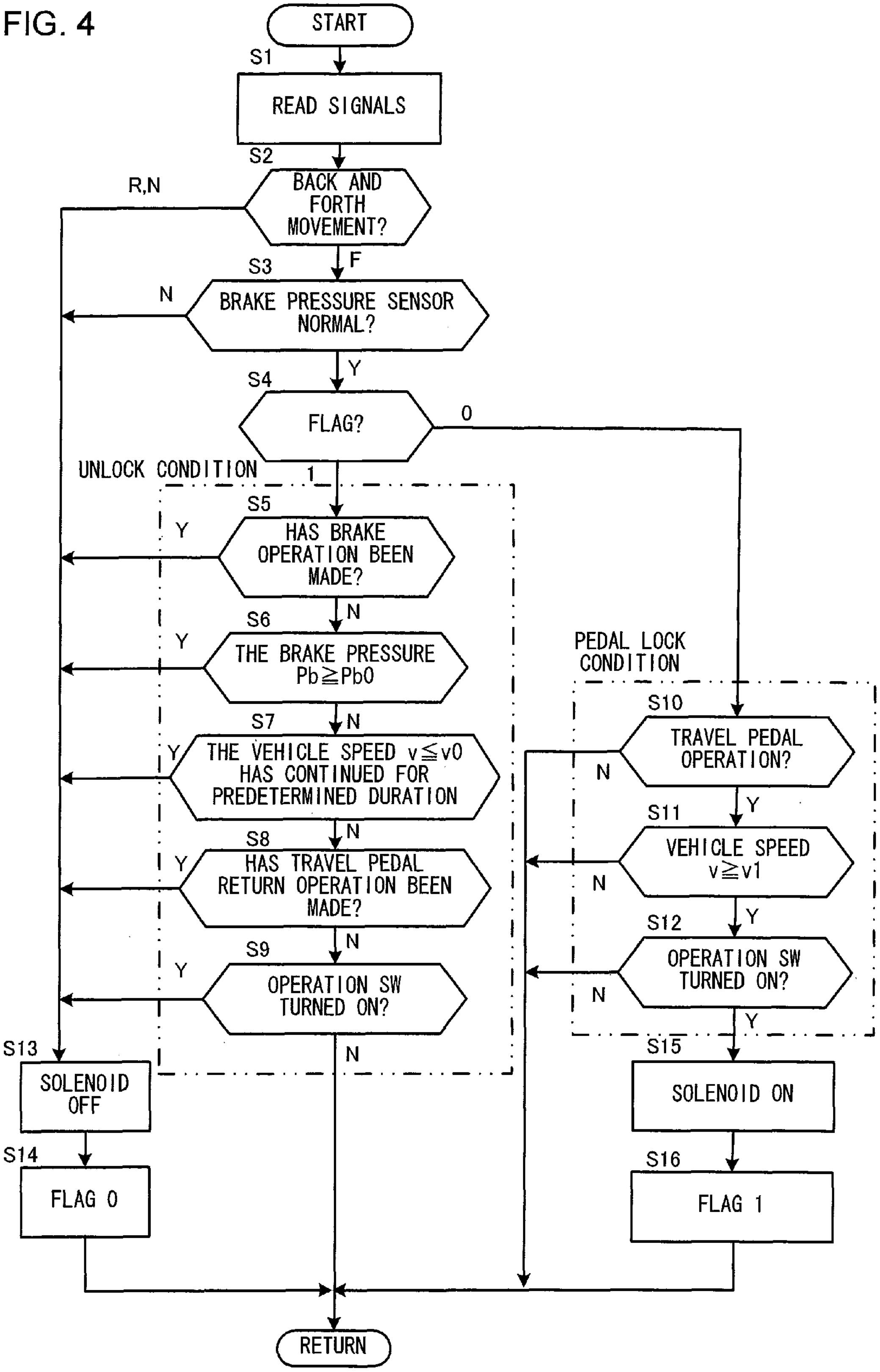
FIG. 4 is a flowchart showing an example of processing executed by a controller of FIG. 3.

FIG. 4 is a flowchart showing an example of processing executed by the controller 20. The processing shown in the flowchart is initiated, for instance, as the engine key switch (not figured) is turned on. In a step S1, the controller 20 reads the signals from the sensors 21 to 24 and the switches 25 and 26. In a step S2, the controller 20 detects the operation position of the forward/reverse selector switch 25. The controller 20 determines that a forward movement instruction of the work vehicle has been output if the forward/reverse selector switch 25 is operated to the position F, a neutral instruction has been output if the forward/reverse selector switch 25 is operated to the position N, and a backward movement instruction has been output if the forward/reverse selector switch 25 is operated to the position R. If a decision is made that the forward/reverse selector switch 25 has been operated to the position F, the flow of control proceeds to a step S3, whilst if a decision is made that the forward/reverse selector switch 25 has been operated to the position N or the position R, the flow of control proceeds to a step S13.

In the step S3, the controller 20 makes a decision as to whether or not an output value of the brake pressure sensor 22 is normal. In the event that the output value falls within a normal range, the brake pressure sensor 22 is operating properly, so that the result of the decision in the step S3 is YES and the flow of control proceeds to a step S4. On the other hand, since the output value falls outside the normal range when the brake pressure sensor 22 is not operating properly due to disconnection or the like, the result of the decision in the step S3 is NO and the flow of control proceeds to the step S13.

In the step S13, the controller 20 outputs an OFF signal to the solenoid 73 and demagnetizes the solenoid 73. As a result, the locking device 70 is released and the travel pedal 7 is unlocked. Next, in a step S14, a flag is set to 0 and the flow of control returns.

In the step S4, the controller 20 makes a decision as to the value of the flag. The flag is set to 1 when the travel pedal 7 is in a state of being locked (a step S16), whilst the flag is set to 0 when the travel pedal 7 is in a state of being unlocked (the step S14). The flow of control proceeds to a step S5 if a decision is made in the step S4 that the flag is 1, whilst the flow of control proceeds to a step S10 if a decision is made that the flag is 0.

In the step S5, in response to a signal from the brake operation sensor 21, the controller 20 makes a decision as to whether or not the brake has been operated. Here, a brake operation and a lock of the travel pedal 7 are supposed to conflict, and therefore, if there is any brake operation, it is estimated that the operator intends to unlock the pedal.

In the step S5, if the brake operation sensor 21 is turned on, a decision is made that the brake has been operated and the flow of control proceeds to the step S13. On the other hand, if the brake operation sensor 21 is off, a decision is made that the brake has not been operated and the flow of control proceeds to a step S6.

In the step S6, the controller 20 makes a decision as to whether or not the brake pressure Pb, which has been detected by the brake pressure sensor 22, is equal to or greater than a predetermined value Pb0. The predetermined value Pb0 corresponds to, for instance, the brake pressure at which the braking device 17 starts actuating, and, if the brake pressure Pb is equal to or greater than the predetermined value Pb0, it is estimated that the operator intends to unlock the pedal. It is to be noted that the predetermined value Pb0 may be set to a value greater than or a value less than the brake pressure at which the braking device 17 starts to be actuated. The flow of control proceeds to the step S13 if the result of the decision in the step S6 is YES, whilst the flow of control proceeds to a step S7 if the result of the decision in the step S6 is NO.

In the step S7, the controller 20 makes a decision as to whether or not a state in which the vehicle speed v, which is detected by the vehicle speed sensor 23, is equal to or less than a predetermined value v0 has continued for a predetermined duration. The predetermined value v0 is, for example, 0, and a certain duration of time is set so as to assure the detection of a state in which the travel is stopped. It is to be noted that the predetermined value v0 may be set to a value greater than 0. The flow of control proceeds to the step S13 if the result of the decision in the step S7 is YES, whilst the flow of control proceeds to a step S8 if the result of the decision in the step S7 is NO.

In the step S8, based on a signal from the travel operation sensor 24, the controller 20 makes a decision as to whether or not the travel pedal 7 has been operated in a returning direction. In other words, the controller 20 makes a decision as to whether or not the attaching member 75 has been spaced apart from the locking member 74 by the operation of the rear depressing section 7*b*. For example, when the travel pilot pressure Pa is equal to or less than a predetermined value, the controller 20 makes a decision that the travel pedal 7 has been operated in a returning direction. The flow of control proceeds to the step S13 if the result of the decision in the step S8 is YES, whilst the flow of control proceeds to a step S9 if the result of the decision in the step S8 is NO.

In the step S9, the controller 20 makes a decision as to whether or not the operation switch 26 has been turned on, i.e., whether or not an unlock instruction has been output. The flow of control proceeds to the step S13 if the result of the decision in the step S9 is YES, whilst the flow of control returns if the result of the decision in the step S9 is NO.

In the step S10, the controller 20 makes a decision as to whether or not the pressure Pa, which has been detected by the travel operation sensor 24, is equal to or greater than a predetermined value Pa0. The predetermined value Pa0 corresponds to, for example, the pressure at which the travel pedal 7 is fully depressed. It is to be noted that the predetermined value Pa0 may be set to a value less than the pressure at which the travel pedal 7 is fully depressed. The flow of control proceeds to a step S11 if the result of the decision in the step S10 is YES, whilst the flow of control returns if the result of the decision in the step S10 is NO.

In the step S11, the controller 20 makes a decision as to whether or not the vehicle speed v, which has been detected by the vehicle speed sensor 23, is equal to or greater than a predetermined value v1. The predetermined value v1 has been set to a value greater than the predetermined value v0 of the step S7. For instance, given that the maximum vehicle speed is vmax (approximately 20 km/h) as traveling on a flat land, the predetermined value v1 is set to a value approximately half of the maximum vehicle speed vmax. The flow of control proceeds to a step S12 if the result of the decision in the step S11 is YES, whilst the flow of control returns if the result of the decision in the step S11 is NO.

In the step S12, the controller 20 makes a decision as to whether or not the operation switch 26 has been turned on, i.e., whether or not the lock instruction has been output. The flow of control proceeds to a step S15 if the result of the decision in the step S12 is YES, whilst the flow of control returns if the result of the decision in the step S12 is NO.

In the step S15, the controller 20 outputs an ON signal to the solenoid 73 so as to excite the solenoid 73. As a result, the locking device 70 is actuated and the travel pedal 7 is locked. Next, in the step S16, the controller 20 sets the flag to 1 and then the flow of control returns.

In the above processing, the step S10 to the step S12 are defined as a pedal lock condition and the step S5 to the step S9 are defined as an unlock condition. It is to be noted that the processing executed in the step S2 and the step S3 is a prerequisite for performing the pedal lock/unlock. The pedal lock condition is true when all the results of the decisions in the step S10 to the step S12 are YES. At this time, the solenoid 73 is turned on and the locking device 70 is actuated (in the step S15). On the other hand, the unlock condition is true when at least one of the result of the decisions in the step S5 to the step S9 is YES. At this time, the solenoid 73 is turned off and the locking device 70 is released (in the step S13).

The operations of the present embodiment will now be explained more specifically.

(1) Pedal Lock

When the operator operates the forward/reverse selector switch 25 to the position F and depresses the travel pedal 7, pressure oil is supplied from the hydraulic pump 2 to the hydraulic motor 3 and the vehicle travels forward. At this time, if the operator turns the operation switch 26 on in a state where the travel pedal 7 is fully depressed and the vehicle speed v becomes equal to or greater than the predetermined value v1, the pedal lock condition becomes true. As a result, the solenoid 73 is excited, the locking device 70 is actuated, and the travel pedal 7 is locked in a state of being fully depressed (in the step S15).

As a result, a state in which the travel pedal 7 is fully depressed can be retained even if the operator does not apply pedal pressure to the travel pedal 7, so that load on the pedal operation by the operator is reduced while achieving vehicle travel at its maximum speed. Since, even if the operation switch 26 is operated, the pedal is not locked unless the full depression of the travel pedal 7 and a state in which the vehicle speed is equal to or greater than the vehicle speed v1 are detected, the pedal can be prevented from being locked against the operator's will due to incorrect operation of the operation switch 26. It is to be noted that when the forward/reverse selector switch 25 is operated to a position other than the position F or when an abnormality has occurred in the brake pressure sensor 22, the travel pedal 7 is prohibited from being locked regardless of whether or not the pedal lock condition is true.

(2) Unlock

If the brake pedal 14 is operated while the travel pedal 7 is locked, the brake pedal sensor 21 is turned on and the unlock condition becomes true. As a result, the solenoid 73 is demagnetized and the locking device 70 is released (the step S5→the step S13). Also when the brake pedal 14 is operated so as to cause the brake pressure Pb to be equal to or greater than the predetermined value Pb0, the solenoid 73 is demagnetized and the locking device 70 is released (the step S6→the step S13). Consequently, even in the event of a failure of the brake pedal sensor 21, an intention of the operator to unlock the pedal can be reliably detected, so that the locking device 70 can be released in a timely manner.

If the travel pedal 7 is operated by the rear depressing while the travel pedal 7 is locked, the travel pedal 7 is spaced apart from the locking member 74 against the attaching power due to excitation of the solenoid 73. Also in this case, an intention of the operator to unlock the pedal is detected and the solenoid 73 is demagnetized (the step S8→the step S13). Accordingly, the pedal can be unlocked on the operator's own will even in the case of trouble in the braking system. When a state in which the vehicle is stopped is continuously detected for a predetermined duration or when the operation switch 26 is turned on in a state where the pedal is locked, the unlock condition is true and the locking device 70 is released (the step S7→the step S13 and the step S9→the step S13).

According to the present embodiment, the following operational effects can be achieved.

(1) The travel pedal 7 is locked when the operation switch 26 is turned on in a state where the travel pedal 7 is fully depressed and the vehicle speed v is equal to or greater than the predetermined value v1 (lock actuation condition is true). As a result, an intention of the operator to lock the pedal, which is expressed by turning the operation switch 26 on, can be appropriately determined, so that the travel pedal 7 can be prevented from being locked against the operator's will in the case of incorrect operation of the operation switch 26.

(2) Since the locking device 70 is actuated subject to the vehicle speed v being equal to or greater than the predetermined value v1, the pedal is allowed to be locked in response to the travel situation, thereby actuating the pedal lock under an appropriate vehicle condition.

(3) The travel pedal 7 is not locked while the vehicle is traveling at low speeds, so that the vehicle speed can be adjusted smoothly through the travel pedal 7.

(4) Since the locking device 70 is actuated subject to the travel pedal 7 being fully depressed, an intention of the operator to lock the pedal can be reliably detected.

(5) The travel pedal 7 is supposed to be locked only in the case that an intention to travel at the maximum vehicle speed is detected, so that the pedal lock can be actuated in a timely manner.

(6) Since the travel pedal 7 is locked by excitation of the solenoid 73 in a state where the travel pedal 7 is fully depressed, the structure is simplified.

(7) The locking device 70 is released when the unlock condition is true, i.e., the brake pedal 14 is operated, the brake pressure Pb is equal to or greater than the predetermined value Pb0, a state in which the vehicle speed v is equal to or less than the predetermined value v0 has continued for a predetermined duration, the travel pedal 7 is operated in a returning direction, or the operation switch 26 is turned on. As a result, even in the event of a failure of the brake operation sensor 21, an intention of the operator to unlock the pedal can be detected not only by the operation switch 26, thereby assuring the unlock of the pedal.

(8) Since the locking device 70 is released subject to the brake pressure Pb being equal to or greater than the predetermined value Pb0, brake operation by the operator can be reliably detected, so that the pedal lock can be released in a timely manner in line with an intention of the operator.

(9) Since the locking device 70 is released subject to return operation by depressing the rear depressing section 7*b* of the travel pedal 7, in the event that the travel pedal 7 is forcibly returned, the travel pedal 7 is not locked even if the travel pedal 7 is fully depressed once again unless the lock actuation condition described above is true. Thus the travel pedal 7 can be prevented from being locked against the operator's will.

(10) Since the locking device 70 is released subject to a state in which the vehicle speed v is equal to or less than the predetermined value v0 continuing for a predetermined duration, the pedal can be appropriately unlocked in accordance with the travel situation.

(11) In the event that the vehicle speed momentarily becomes equal to or less than the predetermined value v0 depending upon the travel situation or in the event that a vehicle speed signal momentarily becomes equal to or less than the predetermined value v0 due to noise or the like, the locking device 70 is not released because a state in which the vehicle speed v is equal to or less than the predetermined value v0 has not continued for a predetermined duration, so that the locking device 70 can be stably actuated.

(12) When the forward/reverse selector switch 25 is operated to a position other than the position F, the locking device 70 is not actuated and the locking device 70 is released if the locking device 70 is in action. Thus, the pedal lock is not actuated even if the operation switch 26 is operated while the vehicle is traveling backward, thereby assuring the safety.

(13) In the event of a failure of the brake pressure sensor 22, the locking device 70 is not actuated and the locking device 70 is released if the locking device 70 is in action. Thus, the pedal is allowed to be locked only in a situation where the brake operation is reliably detected, thereby assuring the safety.

(14) The operation switch 26 is configured to alternately output a pedal lock instruction and an unlock instruction through pressing operation, thereby making the operation easy.

It is to be noted that if the pedal lock function is required only for use in specific destinations, for instance, processing to make a decision as to vehicle destinations may be added to the prerequisite in FIG. 4 so as to execute the processing of the pedal lock only in vehicles manufactured for use in specific destinations. The structure of the hydraulic circuit as a driving device is not limited to that presented in FIG. 1 as long as the hydraulic motor 3 is driven in response to the operation amount of the travel pedal 7. For instance, the hydraulic pump 2 and the hydraulic motor 3 may be connected in a closed circuit (so-called HST circuit). While the travel pedal 7 is locked by excitation of the solenoid 73 of the locking member 74 in the position as it is fully depressed, it may be fixed in any position and the structure of the locking device 70 as a locking means is not limited to that described above. Although lock and unlock of the travel pedal 7 are instructed by pressing operation of the operation switch 26, an instruction device is not limited to that.

Although in the above embodiment, operation of the brake pedal 14 and return operation of the travel pedal 7 are detected as the unlock condition, a first and a second detection devices are not limited to those described in the above embodiment as long as they detect an unlock operation that reflects an intention of the operator to unlock the pedal. The first and the second detection devices may detect other than deceleration operations. Any structures may be adopted in the brake operation sensor 21 as a brake operation detection device, in the brake pressure sensor 22 as a brake pressure detection device, and in the travel operation sensor 24 as a return operation detection device.

In the above embodiment, the unlock condition is true if a state in which the vehicle speed detected by the vehicle speed sensor 23 as a vehicle speed detection device is equal to or less than the predetermined value v0 is detected continuously for a predetermined duration as well as if the forward/reverse selector switch 25 as a forward/reverse movement detection device is operated to a position other than the position F. However, the unlock condition is not limited to that described above and processing executed by the controller 20 as a lock control device is not limited to that described in FIG. 4 as well. For instance, among the unlock conditions described above, only two signal changes may be detected, i.e., the signal changes that generated in response to an operation that reflects an intention of the operator to release the state of the pedal lock, in addition to the ON operation of the operation switch 26. For example, operation of the brake pedal 14 and the brake pressure Pb, or, operation of the brake pedal 14 and return operation of the travel pedal 7 may be detected. In addition to those signals, the vehicle traveling speed of the work vehicle may be detected, or the back and forth movement instruction of the work vehicle may be detected.

According to an embodiment of the present invention explained above, since the locking device is released when an unlock operation is detected by at least one of the first and the second detection devices in a state where the travel pedal is locked, the pedal lock is reliably released even in the event of a failure of either one of the detection devices.

Although, in the above, a case in which the pedal lock control device according to an embodiment of the present invention is applied to a wheeled hydraulic excavator is explained, the present invention may be applied in the same manner to other work vehicles such as a wheel loader. In other words, the present invention is not limited to the pedal lock control device of the embodiment as long as features and functions of the present invention are achieved.

The disclosure of the following priority application is herein incorporated by reference:

Japanese Patent Application No. 2007-257717 (filed on 1 Oct. 2007)

The invention claimed is:

1. A pedal lock control device for work vehicle, comprising:

a motor driving device that drives a travel hydraulic motor according to an operation amount of a travel pedal;

a locking device that locks the travel pedal in a state of being operated;

an instruction device that instructs lock and unlock of the travel pedal by the locking device upon an operation by an operator;

a first detection device that detects a first signal change caused by a deceleration operation which is an operation that reflects an intention of an operator to release the locking device and is other than an unlock operation by the instruction device;

a second detection device that detects a second signal change caused by the deceleration operation, with the first signal change and the second signal change being two different signal changes caused by the same deceleration operation; and a lock control device that unlocks the locking device based on the signal change detected by at least one of the first detection device and the second detection device in a state where the travel pedal is locked by the locking device.

2. A pedal lock control device for work vehicle according to claim 1, wherein:

the first deceleration detection device is a brake operation detection device that detects an operation of a brake pedal as the first signal change; and the second deceleration detection device is a brake pressure detection device that detects brake pressure applied to a braking device by an operation of the brake pedal as the second signal change.

3. A pedal lock control device for work vehicle according to claim 1, further comprising:

a vehicle speed detection device that detects vehicle traveling speed of the work vehicle, wherein the lock control device unlocks the locking device, in a state where the travel pedal is locked by the locking device, if a state in which a vehicle speed that has been detected by the vehicle speed detection device is equal to or less than a predetermined value is detected continuously for a predetermined duration.

4. A pedal lock control device for work vehicle according to claim 1, further comprising:

a back and forth movement detection device that detects a forward movement instruction, a backward movement instruction, and a neutral instruction for the work vehicle, wherein:

the lock control device unlocks the locking device, in a state where the travel pedal is locked by the locking device, if either one of the backward movement instruction and the neutral instruction is detected by the back and forth movement detection device.

5. A pedal lock control device for work vehicle according to claim 1, wherein:

the locking device comprises a locking member provided below the travel pedal and an attaching member provided on a back of the travel pedal so as to be attached to the locking member, and locks the travel pedal by attaching the attaching member to the locking member.

6. A work vehicle that is provided with a pedal lock control device according to claim 1.

* * * * *